(12) United States Patent
Tkacik et al.

(10) Patent No.: US 8,826,391 B2
(45) Date of Patent: Sep. 2, 2014

(54) VIRTUALIZED TRUSTED DESCRIPTORS

(75) Inventors: Thomas E. Tkacik, Phoenix, AZ (US); Carlin R. Covey, Tempe, AZ (US); David H. Hartley, Seaview Downs (AU); Steven D. Millman, Gillbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 122 days.

(21) Appl. No.: 13/540,606

(22) Filed: Jul. 2, 2012

(65) Prior Publication Data

US 2014/0006804 A1 Jan. 2, 2014

(51) Int. Cl.
*G06F 21/00* (2013.01)

(52) U.S. Cl.
USPC ...... 726/4; 726/2; 726/15; 713/189; 713/192; 718/1

(58) Field of Classification Search
CPC ........... G06F 9/45533; G06F 9/45545; G06F 9/45558; G06F 12/1027; G06F 12/1036; G06F 12/1063; G06F 21/53; H04L 63/0272

USPC ................ 726/2–4, 15; 718/1; 713/189, 192
See application file for complete search history.

(56) References Cited

U.S. PATENT DOCUMENTS

| | | | |
|---|---|---|---|
| 6,766,353 B1 * | 7/2004 | Lin et al. ................ | 709/203 |
| 2005/0257059 A1 | 11/2005 | Schaefer et al. | |
| 2008/0168259 A1 | 7/2008 | Biran et al. | |
| 2008/0288941 A1 * | 11/2008 | Adams et al. ............ | 718/1 |
| 2011/0225278 A1 | 9/2011 | Monchiero et al. | |
| 2012/0151564 A1 * | 6/2012 | Robert et al. ............ | 726/7 |

* cited by examiner

*Primary Examiner* — Kaveh Abrishamkar
*Assistant Examiner* — Ayoub Alata

(57) ABSTRACT

Embodiments of information processing systems and associated components can include logic operable to perform operations in a virtualized system including a plurality of guest operating systems using descriptors. The descriptors specify a set of commands defining the operations in a plurality of security domains and specify permission to a plurality of resources selectively for the plurality of guest operating systems.

18 Claims, 10 Drawing Sheets

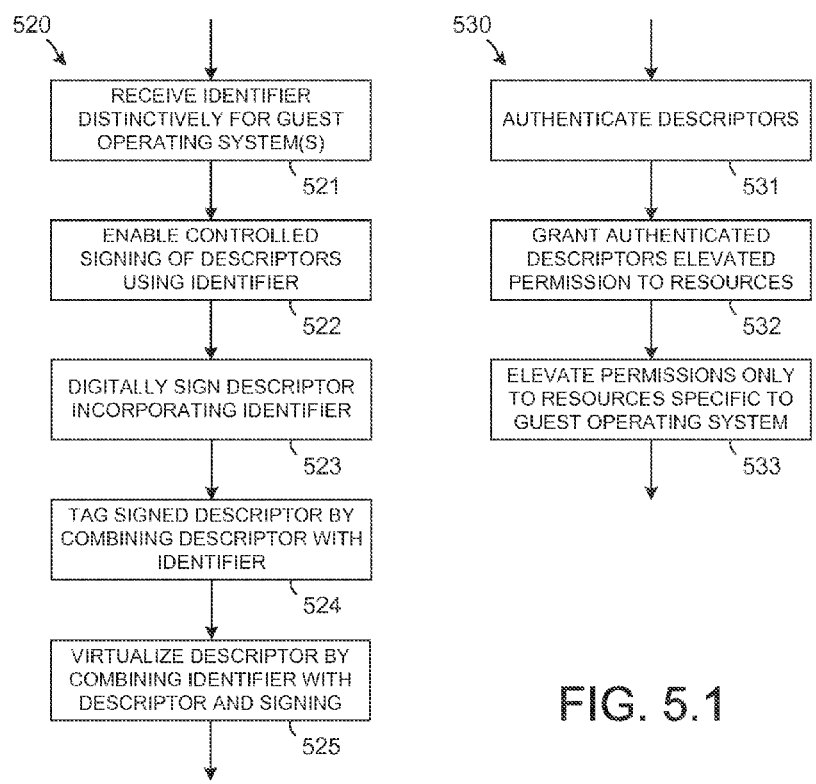
FIG. 5.1

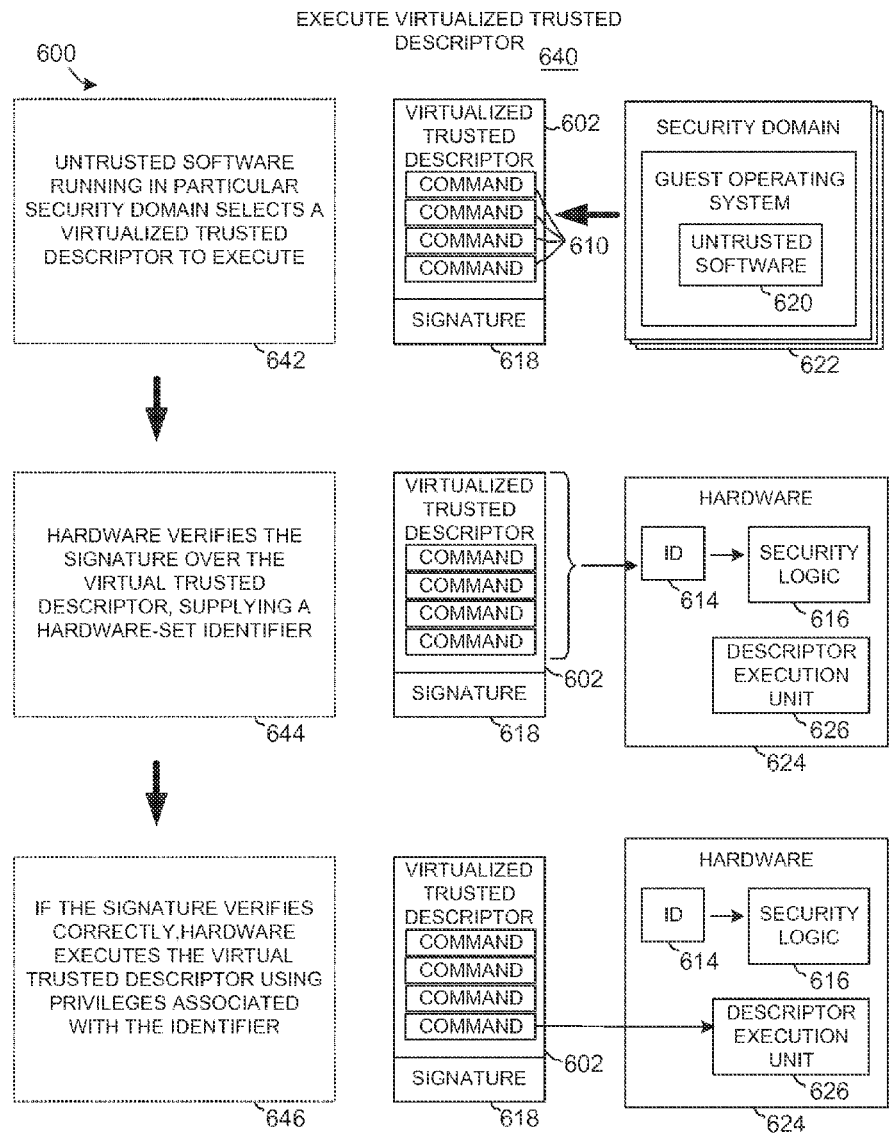
FIG. 6.1

VIRTUALIZED TRUSTED DESCRIPTORS

BACKGROUND

A cryptographic system is a data processing, information processing, computing system, or the like which includes cryptographic applications and/or functions. Examples of cryptographic systems include secure email systems, smartcards, point of sales terminals, network routers, and the like including methods such as digital signatures, cryptographic hash functions, key management techniques, and the like. Cryptographic systems comprise cryptographic primitives of various levels of complexity.

Typical cryptographic systems include algorithms for key generation, encryption, and decryption. Ciphers refer to a pair of algorithms, one for encryption and one for decryption. Cryptographic systems commonly use a key generation algorithm and often exploit public key techniques and/or symmetric key techniques.

BRIEF DESCRIPTION OF THE DRAWINGS

Embodiments of the invention relating to both structures and methods of operation may best be understood by referring to the following description and accompanying drawings.

DETAILED DESCRIPTION

A descriptor is a set of commands that are processed, for example, by hardware such as a security module that is configured to perform cryptographic functions. A descriptor becomes a trusted descriptor by including a digital signature to verify validity. Trusted descriptors may be run by either trusted or untrusted software, but (when so configured) only trusted software is allowed to create trusted descriptors. Trusted descriptors can not only be created by trusted software, but can also be run by trusted software. Trusted descriptors can gain access to special internal resources of the hardware that are not accessible to normal descriptors (those that are not trusted descriptors).

In a system with multiple processing cores and virtualization of system components, multiple security domains may exist, each of which may require use of trusted descriptors, but do not trust the trusted descriptors of other security domains. A system, system components, and associated operating methods are disclosed herein that enable the creation of multiple classes of trusted descriptors, each of which may gain access to resources allocated to a particular security domain that are inaccessible to normal (not trusted) descriptors.

In some applications, certain secret keys (such as High-bandwidth Digital Content Protection (HDCP) or Digital Transmission Content Protection (DTCP)) must be used only by a single operating system. Other operating systems must not be allowed to gain access to those keys. However, in some hardware implementations trusted descriptors are used to access those keys, and therefore an operating system that can run the trusted descriptor can potentially gain access to the keys. The system and components disclosed herein enable creation of trusted descriptors that can be executed only by the proper operating system, and other guest operating systems will not be able to share that access.

Embodiments of systems, components, and associated methods enable signing of descriptors and enable signatures attached to the descriptors to be tagged with an operating system-assigned value. Accordingly, these systems, components, and methods are capable of supporting multiple trusted applications, which may not trust one another, avoiding the constraint that all trusted applications must trust all other trusted applications.

Figure 1:
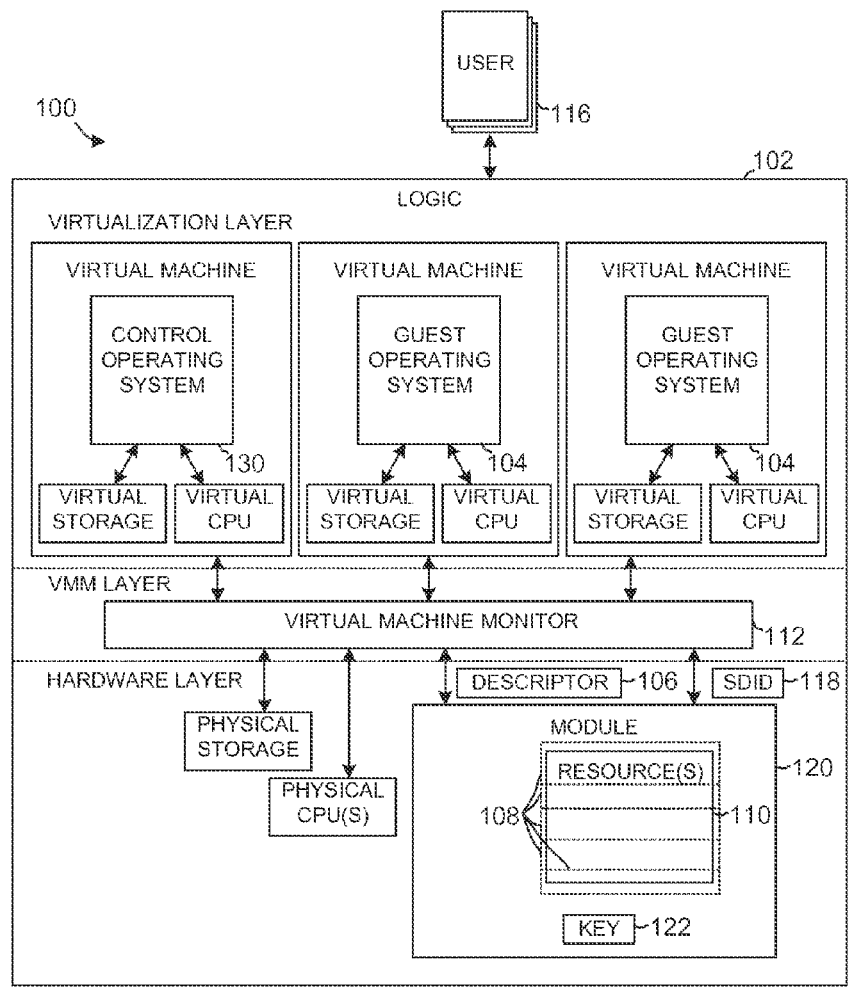
FIG. 1 is a schematic block diagram depicting an embodiment of an information processing system 100 that can use virtualized trusted descriptors to control system operations.

Referring to FIG. 1, a schematic block diagram depicts an embodiment of an information processing system 100 that can use virtualized trusted descriptors to control system operations. The illustrative information processing system 100 comprises logic 102 operable to perform operations in a virtualized system 100 which includes a plurality of guest operating systems 104 using descriptors 106 that specify a set of commands defining operations that may be performed in a plurality of security domains 108. A security domain is a set of entities that is subject to a given security policy and a single security administration. A security token can be issued to a user after the user has actively authenticated with a user ID and password to the security domain. A security domain identifier can be used to identify a set of restricted resources that a trusted descriptor can access. The descriptors 106 further grant permission to access a plurality of resources 110 selectively for the plurality of guest operating systems 104.

In some embodiments, the information processing system 100 can further comprise a virtual machine monitor (VMM) 112 operable to allocate a plurality of resources 110 among a plurality of virtual machines or for particular users 116. The virtual machine monitor 112 can be configured to run a plurality of guest operating systems 104. The virtual machine monitor 112 can be further configured to set a security domain identifier (SDID) 118 distinctively for selected operating systems of the plurality of guest operating systems 104 such that the selected guest operating systems 104 are operable when signing a descriptor 106 associated with the guest operating system 104 by tagging the descriptor 106 with the security domain identifier 118 but are unable to modify the security domain identifier 118.

Figure 2:
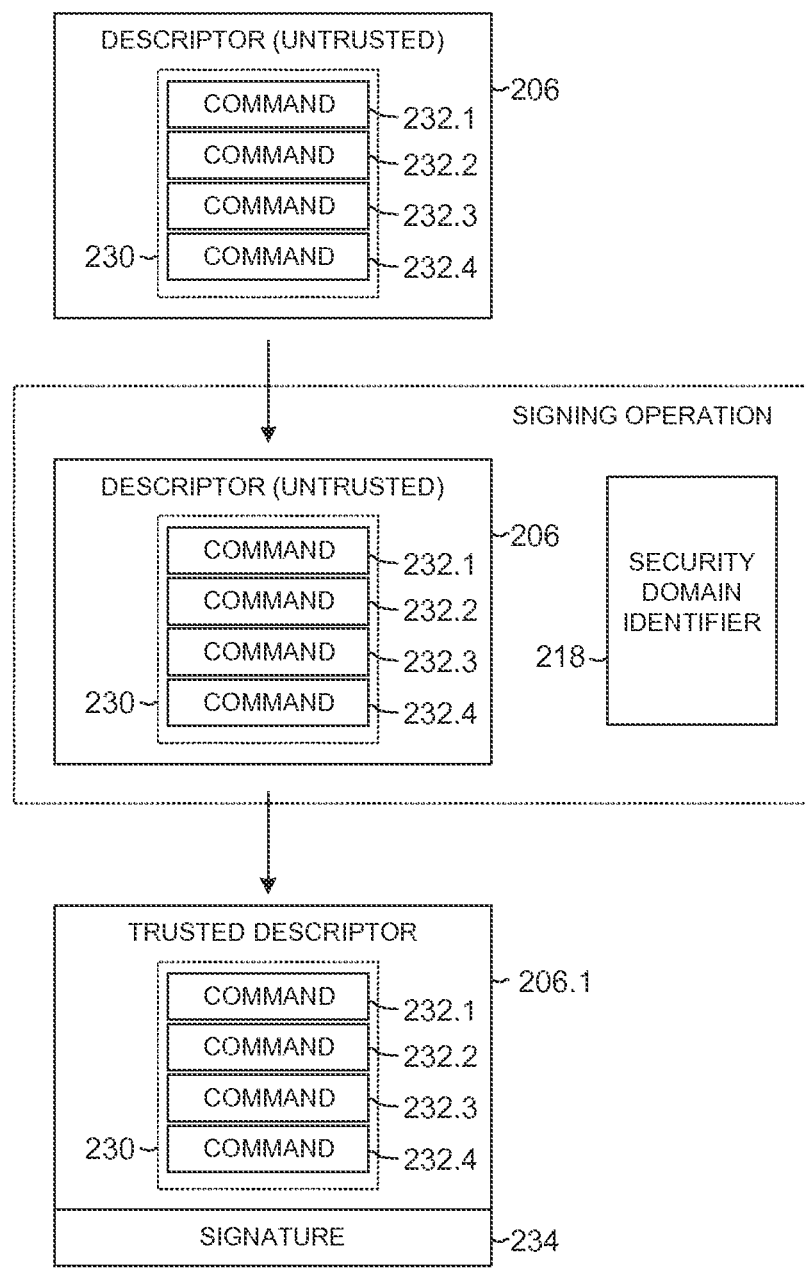
FIG. 2 is a schematic data structure diagram illustrating an embodiment of a descriptor that can be used to control system operations.

In various embodiments, the information processing system 100 can further comprise at least one descriptor 106. As shown in FIG. 2, a schematic data structure diagram, an embodiment of descriptor as an untrusted descriptor 206 and upon signing as a trusted descriptor 206.1 can comprise a set 230 of commands 232.1, 232.2, 232.3, and 232.4 that define operations to be performed. The signed descriptor 206.1 includes a digital signature 234 that verifies validity of the descriptor 206.1, and a security domain identifier 218 that specifies access to resources in a plurality of security domains in a virtualized system.

A descriptor can be defined as a program that can be executed by hardware. A descriptor is a set of commands executed by a module such as a processing engine. In a specific example, the descriptor can be a set of commands executed by a security module or security engine. Not all descriptors should be granted the same access privileges to resources such as keys and other sensitive information because different descriptors may be created by software of different provenance or of different levels of trustworthiness. Therefore, software of particular provenance or of particular trustworthiness may be granted the ability to designate certain descriptors as trusted to properly handle special privileges. Trusted software can digitally sign these descriptors to distinguish them from ordinary descriptors, and to ensure that they are not modified by untrusted software. Such signed descriptors can be called trusted descriptors. For systems with virtualization, different guest operating systems can use dedicated trusted descriptors that can access a particular operating system's sensitive resources, but cannot access the sensitive resources of other guest operating systems. Virtualization of a trusted descriptor refers to generation of a virtual version of the descriptor, corresponding to a particular security domain by combination with a security domain identifier. Such virtualized trusted descriptors enable usage of different classes of trusted descriptors that are granted extra permission only when executed on behalf of the intended guest operating system.

Referring again to FIG. 1, embodiments of the information processing system 100 can further comprise a module 120 that receives the security domain identifier 118 and digitally signs descriptors (e.g., descriptor 106), thereby incorporating the security domain identifier 118 within a signed descriptor 106.

The module 120, for example operable as a security module, is capable of executing descriptors 106. The module 120 can include a Trusted Descriptor Signing Key (TDSK) 122 which can be generated randomly at each reset. The module 120 can further include logic such as executable logic which can be in the form of software, firmware, hardware, or other logic, or possibly in the form of a data structure, or a combination of any of the above. The logic can perform various aspects of module operation.

The disclosed information processing system 100 and module 120 can incorporate into a signature attached to a trusted descriptor 106 a security domain identifier 118, thus tagging the trusted descriptor with that security domain identifier. The security domain identifier 118 can be assigned by software such as a control operating system 130 and cannot be modified by a guest operating system 104. A guest operating system 104 can execute only those trusted descriptors 106 specifically tagged with the security domain identifier assigned to the guest operating system 104. The signatures over trusted descriptors tagged with other security domain identifiers will not authenticate properly, and the module 100 will not allow such unauthenticated trusted descriptors to access sensitive resources. A properly authenticated trusted descriptor 106 can gain access only to resources 110 owned by that guest operating system 104, and not to any other guest operating system.

The module 120 can include logic that enables controlled signing of descriptors 106 using a security domain identifier 118 that is specified by the control operating system 130 and is different for each guest operating system 104. Accordingly, some embodiments of the information processing system 100 can further comprise a module 120 that enables controlled signing of descriptors 106 using a security domain identifier 118 which is specified by a virtual machine monitor 112 configured to specify the security domain identifier 118 distinctively for a selected one of the plurality of guest operating systems 104 and to protect integrity of the security domain identifier 118.

Similarly, in some embodiments and/or applications, the information processing system 100 can further comprise a module 120 that virtualizes the descriptor 106 by combining the security domain identifier 118 with the descriptor 106 and then signing the combined security domain identifier 118 and descriptor 106. The security domain identifier 118 can be set by a supervisory virtual machine monitor 112 for usage by a guest operating system 104 that is unable to modify the security domain identifier 118. The module 120 can be operable when signing the descriptor 106 such that the descriptor 106 is tagged with the security domain identifier 118.

The module 120 can also include logic for tagging the signed trusted descriptors 106 with that security domain identifier 118 by combining the descriptor 106 with the security domain identifier 118, and then signing the combination of descriptor 106 and security domain identifier 118. Signing or digital signing is a mathematical technique for demonstrating authenticity of a digital message or document. A valid digital signature enables a recipient to determine that the message was created by a known sender, and not altered in transit. Digital signatures are often used for software distribution, financial transactions, and in other applications to detect forgery or tampering. Digital signatures often use a type of asymmetric cryptography. For messages sent through a non-secure channel, a properly implemented digital signature enables the receiver to determine the message was sent by the claimed sender. Digital signature schemes are typically cryptographically based. Thus, further embodiments of the information processing system 100 can comprise a module 120 that tags signed descriptors 106 with the security domain identifier 118 by pre-pending, appending, or otherwise combining the descriptor 106 with the security domain identifier 118 before signing the descriptor 106.

The module 120 can include logic to authenticate trusted descriptors 106 and grant the trusted descriptors 106 elevated permissions, only when the security domain identifier 118 is the same as that used when signing the trusted descriptor 106. Accordingly, module 120 can also authenticate descriptors 106. For example, embodiments of the information processing system 100 can further comprise a module 120 that authenticates descriptors 106 and grants the authenticated descriptors 106 elevated permissions only when the security domain identifier 118 used for authentication is the same as the security domain identifier 118 that was used when signing the descriptor 106.

Module 120 can include logic to elevate permissions only to those resources 110, such as resources internal to the module 120, which are owned by the corresponding associated guest operating system 104, but not to all other resources. Hence, in various embodiments and/or applications, the information processing system 100 can further comprise a module 120 that elevates permissions only to resources 110 specified by the security domain identifier 118 to be owned by a guest operating system 104 associated specifically with the descriptor 106 but not to other resources 110.

Virtualized trusted descriptors can be used to impose security among trusted applications and trusted resources according to aspects of functionality of various components and devices. In an embodiment, a security operation performed on a signature and the descriptor is a hash operation, although other security operations can be performed in various embodiments. The security operation is typically some type of digital signature. In an example implementation, a symmetric key digital signature or public key digital signature can be used as the signature.

The security operation is used not only to determine the integrity of the descriptor to be run but also the authentication. Therefore, an operation is selected that is suitable to check authentication as well as checking integrity. The signature key 122 used for signing the trusted descriptor must be protected. If any user or operating system can attain access to the signature key 122 that signs the trusted descriptor, then the user or operating system can create trusted descriptors outside of the hardware module. So whether a symmetric Hash-based Message Authentication Code (HMAC) key or a private key is used as the trusted descriptor signature key 122, that signature key 122 has to be protected. HMAC is a cryptographic operation such as a keyed hash. HMAC is a specific construction for calculating a MAC involving a cryptographic hash function in combination with a secret key, which thus can be called a keyed hash. A symmetric HMAC key is beneficial because at an equivalent security strength, symmetric key digital signatures demand less computation than public key digital signatures, and is practical because signing and verification is performed on the same device. Public key encryption is typically used so that one group can perform the signature while anyone can perform verification. In an illustrative implementation, a capability for anyone to perform verification is not necessary so the same protected signature key 122 can be used for verification. Thus, the verification key can also be protected and is the same key as the signature key. In public key cryptography, the signature key 122 must be protected but the public key is not protected, so anyone can have access to the public key.

Embodiments of a system, components and devices in the system, and associated operating methods can use a combination of one or more of three types of descriptors including normal or untrusted descriptors, trusted descriptors, and virtualized trusted descriptors. For a trusted descriptor running on a device in a system with only a single security domain, all types of trusted descriptors are equivalent (with respect to security) so that all types of trusted descriptors have access to the same restricted resources and the application can be configured to use the resources and trusted descriptors in a somewhat interchangeable manner. An application running in a system with only a single security domain has access to all trusted descriptors and all resources. Any user running a trusted descriptor has access to all of the restricted resources pointed to by the trusted descriptor, a suitable condition for usage with a single operating system.

The trusted descriptor may be inadequate for suitable security in a virtualized system to create a virtual rather than actual version of resources according to user or operation system, since access to resources can violate desired security considerations. Virtualized trusted descriptors can be used to ensure security in a virtualized system.

In embodiments of a system which includes virtualization, a hypervisor can run one or more guest operating systems. A first guest operating system can have trusted descriptors that are permitted access to restricted resources allocated in particular to the first guest operating system, while a second guest operating system attempting to run those trusted descriptors is not permitted to attain access to the resources of the different (first) guest operating system. Thus, the second guest operating system can run a trusted descriptor specifically allocated to itself but cannot use the trusted descriptor to gain access to the first guest operating system's restricted resources. Without virtualization of trusted descriptors by combining a security domain identifier with the descriptor, use of restricted resources among multiple guest operating systems could not be separated since all trusted descriptors would be usable by all guest operating systems. Virtualized trusted descriptors as enabled by the illustrative embodiments of systems, components and devices, and associated methods enable a technique for supplying separation among trusted descriptors, guest operating systems, and protected resources so that a first guest operating system has associated trusted descriptors that enable access to restricted resources that are limited to access by the first guest operating system. Similarly, a second guest operating system has associated trusted descriptors that enable access to restricted resources that are limited to access by the second guest operating system. Accordingly, virtualized trusted descriptors enable separation.

Figure 3:
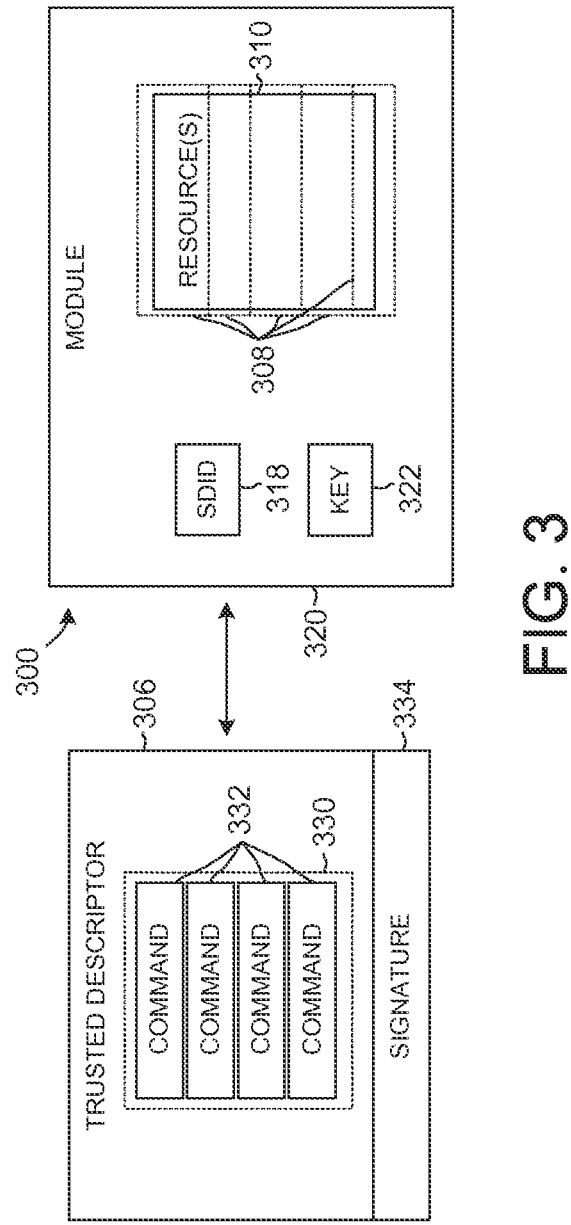
FIG. 3 is a schematic block and flow diagram that shows an embodiment of an electronic circuit which can use trusted descriptors to control and separate system operations among multiple resources.

To enable and facilitate trusted applications, a module can support trusted descriptors. Referring to FIG. 3, a schematic block diagram depicts an embodiment of an electronic circuit 300 which can use trusted descriptors to control system operations. The illustrative electronic circuit 300 can comprise a module 320 configured to perform operations specified by a descriptor 306 comprising a set 330 of commands 332 that define the operations, a digital signature 334 that verifies validity of the descriptor 306, and a security domain identifier 318 that specifies access to resources 310 in a plurality of security domains 308 in which a security domain identifier identifies a set of restricted resources accessed using the descriptor 306.

The module 320 is adapted for usage with trusted descriptors. However, not all trusted descriptors can be run by all guest operating systems. Trusted descriptors can be configured to restrict their usage to particular applications. To support multiple trusted applications, for example two or more Digital Rights Management (DRM) programs or trusted interconnects, trusted descriptors are disclosed herein that are allowed access to resources such as secret keys for specified trusted applications, but not to protected resources of other trusted applications. Trusted interconnects include, for example. High-bandwidth Digital Content Protection (HDCP), Digital Transmission Content Protection (DTCP), or the like.

DRM is a class of access control technologies used by entities such as hardware manufacturers, publishers, copyright holders, and others to limit the use of digital content and devices after sale. DRM can be any technology that inhibits uses of digital content that are not intended by a content supplier. HDCP is a form of digital copy protection which can prevent unauthorized copying of digital audio and video content while passing across connections, thereby preventing HDCP-encrypted content from being played on devices that do not support HDCP or which have been modified to copy HDCP content. DTCP is a DRM technology geared to restrict digital home technologies such as DVD players and televisions by encrypting interconnections between devices, allowing the content to be distributed through other devices such as personal computers or portable media players that implement DTCP standards.

The illustrative circuits and corresponding systems and methods enables multiple classes of trusted descriptors, each with different elevated permissions. In some embodiments, the electronic circuit 300 can further comprise the module 320 which is configured to receive the security domain identifier 318 and to digitally sign the descriptor 306 incorporating the security domain identifier 318 within the signed descriptor 306.

Trusted descriptors 306 can be digitally signed, for example using SHA-256 HMAC with a secret Trusted Descriptor Signing Key (TDSK) 322. The trusted descriptor 306 can only be signed when allowed, but may run at any time. When run, the descriptor 306 attains elevated permissions to specified resources which are internal to the module 320.

In cryptography, HMAC is a particular technique for calculating a message authentication code (MAC) including a cryptographic hash function in combination with a secret key. A MAC can be used to simultaneously verify both data integrity and authenticity of a message. In various embodiments, any suitable cryptographic hash function, such as Message Digest Algorithm (MD-5), Secure Hash Algorithm (SHA-1, SHA-2, SHA-3), or the like, can be used in the HMAC calculation. Cryptographic strength of the HMAC depends on cryptographic strength of the underlying hash function, size of hash output length in bits, and size and quality of the cryptographic key. SHA-256 is a cryptographic hash function in a set of functions published in 2001 by National Institute of Standards and Technology (NIST) as a Federal Information Processing Standard (FIPS), for example in publication PUB 180-2.

Figure 4:
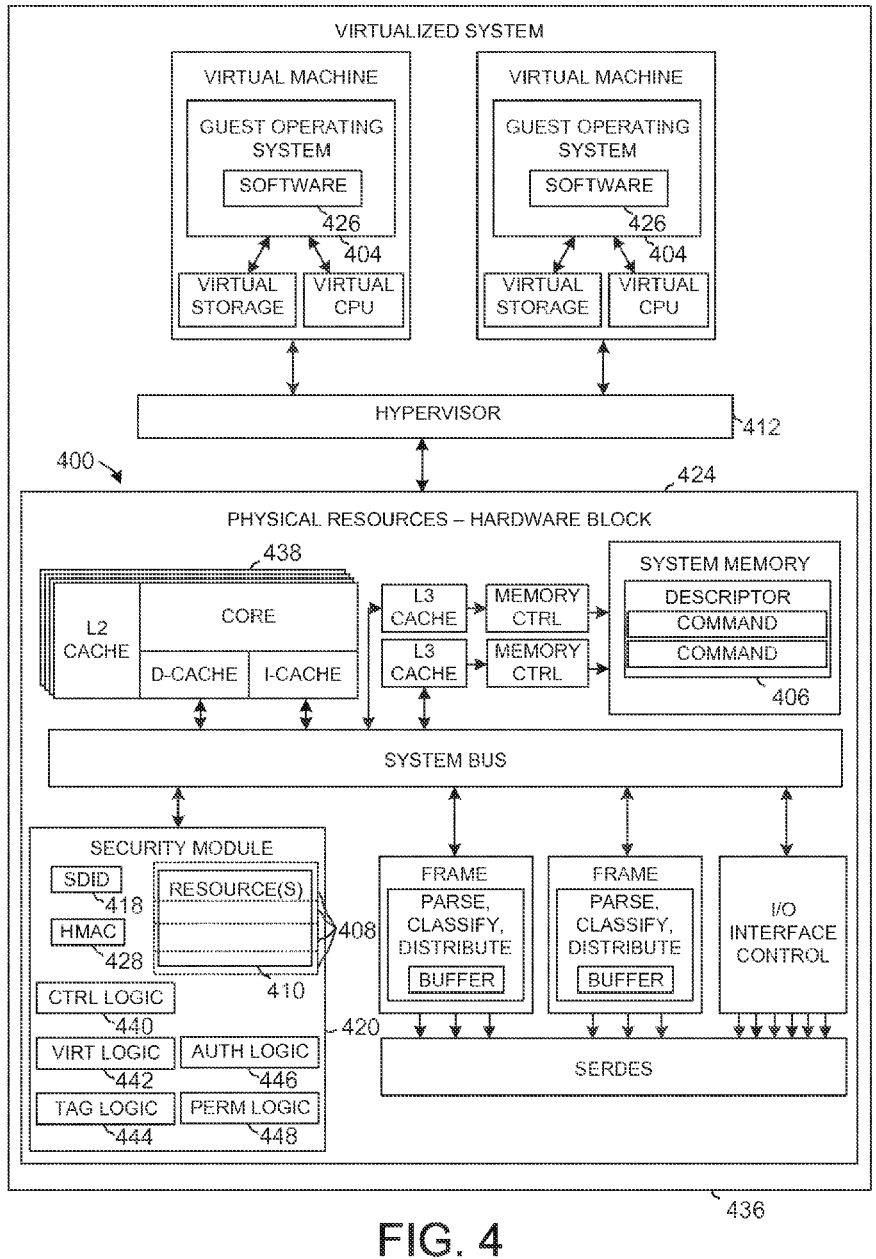
FIG. 4 is a schematic block and flow diagram that shows an embodiment of an electronic circuit which can use virtualized trusted descriptors to control system operations.

In virtual systems, virtualization of trusted descriptors can limit the scope of trust to particular guest operating systems in combination with corresponding particular virtualized trusted descriptors. Referring to FIG. 4, a schematic block diagram depicts an embodiment of an electronic circuit 400 which can use virtualized trusted descriptors to control system operations in a system with multiple processors or cores 438. In various embodiments and/or applications, the electronic circuit 400 can be configured wherein the module 420 comprises logic 440 that enables controlled ("CTRL") signing of descriptors 406 that incorporates a security domain identifier 418 specified by a virtual machine monitor (hypervisor) 412 which is configured to specify distinctively the security domain identifier 418 for a plurality of guest operating systems 404 in a virtualized system 436 and protect integrity of the security domain identifier 418.

A multiple core processor is typically a single computing component with two or more independent actual processors called cores, the units which read and execute program instructions including common instructions (add, move, branch, and the like). The multiple cores can execute many instructions at one time, increasing execution speed for programs suitable for parallel computing. The multiple cores can be integrated onto a single integrated circuit or onto multiple dies in a package. Multiple core processors are commonly used in many application domains including general-purpose computing, network, digital signal processing, graphics, embedded, and the like.

Virtualization refers to creation of a virtual rather than actual version of an entity such as an operating system, hardware platform, storage device, network resources, or others. With virtualization, several operating systems can be run in parallel on a single processor; a parallelism that can reduce overhead costs and differs from multitasking, which involves running several programs on the same operating system. A common goal of virtualization is to centralize administrative tasks while improving scalability and overall hardware-resource utilization. Hardware or platform virtualization involves creation of a virtual machine that operates in the manner of a physical computer with an operating system and can run software separately from the underling hardware resources. To virtualize trusted descriptors, the security domain identifier 418 is combined with the descriptor, and the combination is signed. Accordingly, in more specific embodiments and/or applications, the electronic circuit 400 can be further configured wherein the module 420 comprises logic 442 that virtualizes ("VIRT") the descriptor 406 by combining the security domain identifier 418 with the descriptor 406 and then signing the combined security domain identifier 418 and descriptor 406. The security domain identifier 418 can be set by a supervisory virtual machine monitor 412 for usage by a guest operating system 404 that is operable when signing the descriptor 406 wherein the descriptor 406 is tagged with the security domain identifier 418. The guest operating system 404 is unable to modify the security domain identifier 418.

For example, the security domain identifier 418 can be set by a hypervisor with a guest operating system 404 prohibited from modifying the security domain identifier 418 associated with the guest operating system 404. When the module 420 signs a descriptor 406 allocated to a particular guest operating system 404, that trusted descriptor 406 is thus tagged with the security domain identifier 418.

In some particular embodiments of the electronic circuit 400, the module 420 can comprise logic 444 that tags signed descriptors 406 with the security domain identifier 418 by pre-pending the descriptor 406 with the security domain identifier 418 before signing the descriptor 406. In alternate embodiments, the module 420 may include logic that appends the descriptor 406 with the security domain identifier 418 (or otherwise combines the descriptor 406 with the security domain identifier 418) before signing the descriptor 406.

When the trusted descriptor 406 is executed on behalf of the owning guest operating system 404, the descriptor 406 is properly authenticated and thus treated as a trusted descriptor 406. The elevated permissions are limited to resources owned by that guest operating system 404. Accordingly, some embodiments of the electronic circuit 400 can include a module 420 which comprises logic 446 that authenticates ("AUTH") descriptors 406 and grants the authenticated descriptors 406 elevated permissions only when the security domain identifier 418 which is used during authentication is the same as the security domain identifier 418 used when signing the descriptor 418.

Similarly, in some embodiments and/or applications of the electronic circuit 400, the module 420 can comprise logic 448 that elevates permissions ("PERM") only to resources 410 specified by the security domain identifier 418 owned by a guest operating system 404 associated specifically with the descriptor 406 but not with other resources 410. Thus, a different guest operating system has trusted descriptors that are tagged with different security domain identifiers and have elevated permissions limited by the resources owned by the particular guest operating system 404.

In various embodiments, the logic 440, 442, 444, 446, and 448 can be implemented in hardware, firmware, software, or the like. In an illustrative embodiment, the descriptor 406 can be created by software, and can be either normal (untrusted) or trusted. The descriptor 406, as created by software 426, may or may not have a proper signature and is sent to a hardware block 424. The hardware block 424 has the capability to check the signature, not under control of software 426, and enforces the proper SDID 418 assigned by the hypervisor 412. The proper SDID 418 is used to enforce a proper HMAC signing algorithm 428 which can be implemented in hardware 424. Tagging of the SDID 418 is thus enforced by hardware 424 in an illustrative embodiment because allowing untrusted software 426 to perform tagging could defeat the security attained by using trusted descriptors 406 to separate access to multiple security domains 408 with a security domain identifier to identify restricted resources accessed using the descriptor and enable multiple classes of trusted descriptors 406.

Figure 5:
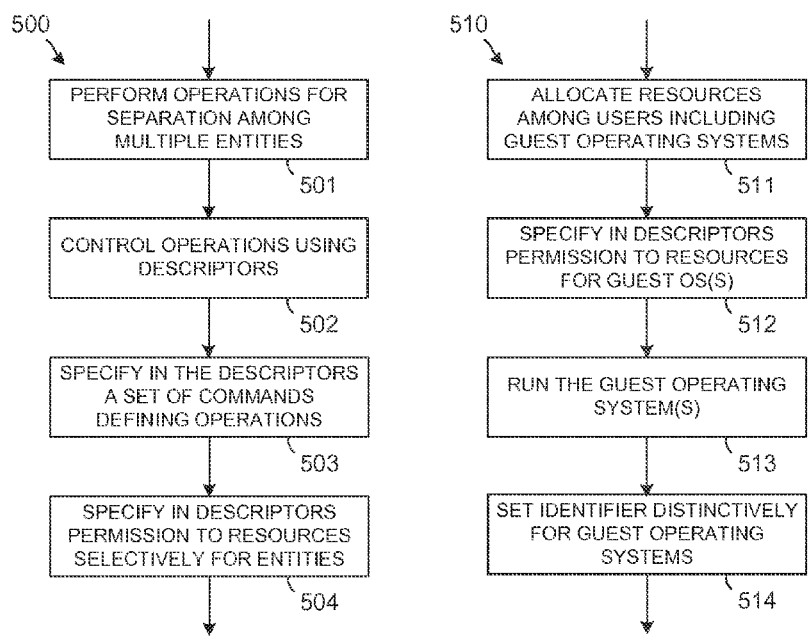
FIG. 5, including FIG. 5.1, shows schematic flow charts illustrating an embodiment or embodiments of a method for securing an information system using virtualized trusted descriptors.

Referring to FIG. 5, including FIG. 5.1, schematic flow charts show an embodiment or embodiments of a method for securing an information system using trusted descriptors that enable separation of security among resources. An embodiment of a method 500 for securing an information system can comprise performing 501 operations in a system with multiple resources that can be accessed by different entities, and controlling 502 the performance of operations using a plurality of descriptors. The method 500 can further comprise specifying 503 in one or more of the plurality of descriptors a set of commands defining the operations in a plurality of security domains, and specifying 504 in one or more of the plurality of descriptors permission to a plurality of resources selectively for the plurality of entities.

The method can be used, for example, by a virtualized system including a plurality of guest operating systems. Thus in some embodiments, a method 510 for securing an information system can further comprise allocating 511 a plurality of resources among a plurality of users in a virtualized system including one or a plurality of guest operating systems, specifying 512 in ones of the plurality of descriptors permission to a plurality of resources selectively for the guest operating system(s) ("OS(S)"), and running 513 the guest operating system(s). A security domain identifier can be set 514 distinctively for a selected one or more of the plurality of guest operating systems such that the guest operating system(s) are operable when signing the descriptor by tagging the descriptor with the security domain identifier while being unable to modify the security domain identifier.

In further embodiments and/or applications, a method 520 for securing an information system can further comprise receiving 521 a security domain identifier specified to identify distinctively ones of one or a plurality of guest operating systems and protect integrity of the security domain identifier, enabling 522 controlled signing of descriptors using the security domain identifier, and digitally signing 523 the descriptor incorporating the security domain identifier within the signed descriptor. Digitally signed descriptors can be tagged 524 with the security domain identifier by pre-pending (or appending or otherwise combining) the descriptor with the security domain identifier before signing the descriptor. The descriptor can be virtualized 525 by combining the security domain identifier with the descriptor and then signing the descriptor.

In various embodiments, a method 530 for securing an information system can further comprise authenticating 531 descriptors, and granting 532 the authenticated descriptors elevated permissions only when the security domain identifier used for authentication is the same as the security domain identifier used when signing the descriptor. Permissions can be elevated 533 only to resources specified by the security domain identifier to be owned by a guest operating system associated specifically with the descriptor but not to other resources.

A descriptor, in most contexts, is a package of information used to control any desired function, operation, or job. For example in the context of a Direct Memory Access (DMA) transfer, the descriptor can simply include a FROM address, a TO address, and a length. The descriptor can be in the form of a relatively small program comprising a series of commands. In the context of a security application, the commands can be cryptographic operations such as loading a key into a key register. In other security operations, the descriptor can control encryption of data with Advanced Encryption Standard (AES), Data Encryption Standard (DES), or others in some mode of operation. In other cryptography examples, a descriptor can cause hardware to load an initialization vector (IV), to locate some input data, to set its size, and to locate output data, thus pointing to the location of input data, describing how much data to encrypt, and directing to a location for writing a result when the operation is finished. The descriptor can also be used to control the type of integrity check to run over the data. The descriptor can call for execution of an Internet Protocol Security (IPsec) protocol, specifying a pointer that points to a packet rather than a block of data, an output frame to which an output packet can be stored, and cryptographic keys to be used in the protocol.

Accordingly, the descriptor can be a list of commands with pointers and data lengths interspersed. In some applications, the descriptor can include data alone, without commands, for example for usage without commands but including information for computations or other operations, or to set forth data that is handled only in a particular specified manner or time.

A descriptor can be converted to a trusted descriptor by adding integrity protection which specifies that the descriptor will run only upon passing of an integrity check. Thus the descriptor can be run only for applications for which the descriptor is intended. Otherwise, the descriptor cannot be run. A trusted descriptor can be created by using an assignment key to add a digital signature to the descriptor so that when the descriptor is created, the creator (e.g., a control operating system or hypervisor) causes a signature to be generated and appended to the descriptor. The trusted descriptor thus includes a program to run and an attached signature so that before the trusted descriptor is run, an integrity check which compares the signatures is executed over the descriptor, thereby verifying the signature. If the signature is incorrect, the descriptor cannot execute. If the signature is correct, the descriptor will execute and may have access to protected resource or resources that a normal descriptor cannot access. If access to a resource is not useful, for example if a user running descriptors on a device does not intend to use a trusted descriptor and no reason exists for such usage, access is not available. However if such access to a resource is desirable, a special key such as an encryption key can be stored to enable access to the key and a trusted descriptor can be run to grant access. If an attempt is made to access the key using a normal descriptor, access will fail and be thus disallowed. The trusted descriptor can only be run if unmodified and only run exactly as the creator of the trusted descriptor intended. The trusted descriptor is a program that can run and grant elevated access privileges, but only by passing the integrity check or signature check.

Figure 6:
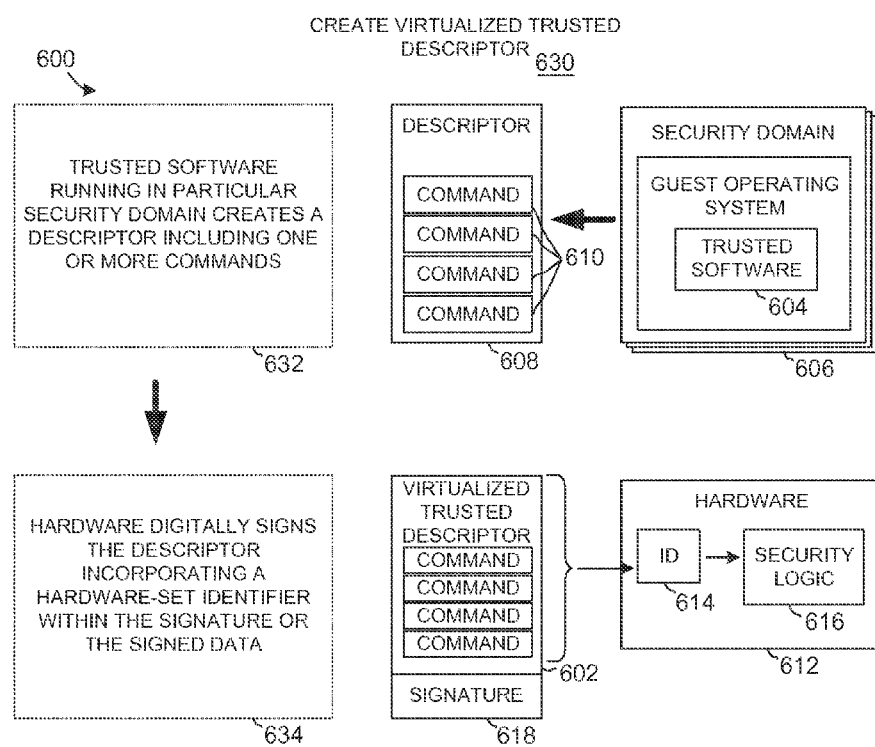
FIG. 6, including FIG. 6.1, shows schematic block and operation flow diagrams illustrating functionality of an embodiment of a system and associated method for virtualizing trusted descriptors.

Referring to FIG. 6, including FIG. 6.1, schematic block and operation flow diagrams illustrate functionality of an embodiment of a system 600 and associated method for virtualizing trusted descriptors. The system 600 can create 630 a virtualized trusted descriptor 602 when, in a first action 632, trusted software 604 running in a particular security domain 606 creates a descriptor 608 that includes one or more commands 610.

The creation of virtualized trusted descriptor 602 can further include operations performed, in an example embodiment, by hardware 612 that includes an identifier 614 and security logic 616. The security logic 616 can perform security operations such as HMAC, a public-key signature calculation, or the like. In a second action 634 of virtualized trusted descriptor creation 630, the hardware 612 can digitally sign the descriptor 608, incorporating the hardware-specified identifier 614 within a signature 618 or the signed data, thereby forming the virtualized trusted descriptor 602.

The virtualized trusted descriptor 602 can also be executed 640. In a first action 642 of the execution operation 640, untrusted software 620 running in a particular security domain 622, which can be the same security domain 606 as the creation operation 630, selects a virtualized trusted descriptor 602 to execute. In a second action 644 of the execution operation 640, hardware 624, which can be the same hardware 612 as in the creation operation 630, verifies the signature 618 over the virtualized trusted descriptor 602, supplying a particular hardware-specified identifier 614. In a third action 646 of the execution operation 640, if the signature verifies correctly, hardware 624 executes the virtual trusted descriptor 602 using privileges associated with the hardware-specified identifier 614 and using a descriptor execution unit 626 in the hardware 624.

Upon creation of the trusted descriptor 602, the identifier 614 is concatenated (or otherwise combined) with the trusted descriptor 602 with the HMAC run across the combination of the trusted descriptor 602 and identifier 614. When the trusted descriptor 602 is verified, the same concatenation operation is used with the identifier 614 combined with the descriptor 602, the HMAC run, and the result is compared to the signature 618 which is appended to (or otherwise combined with) the trusted descriptor 602. Any change of the commands or data inside the descriptor 602 causes the signature to be incorrect. If executed by another operating system, the identifier will identify the operating system and the signature will be wrong and the descriptor will fail, preventing its execution.

The identifier 614 performs multiple functions. First, the identifier 614 identifies whether the trusted descriptor 602 is included in the class of trusted descriptors that are allowed to execute. Second, when the trusted descriptor 602 executes, the identifier 614 identifies which set of restricted resources can be accessed by the trusted descriptor 602. Thus, the same identifier 614 that specifies whether restricted resources can be accessed also can identify the particular restricted resources.

Figure 7:
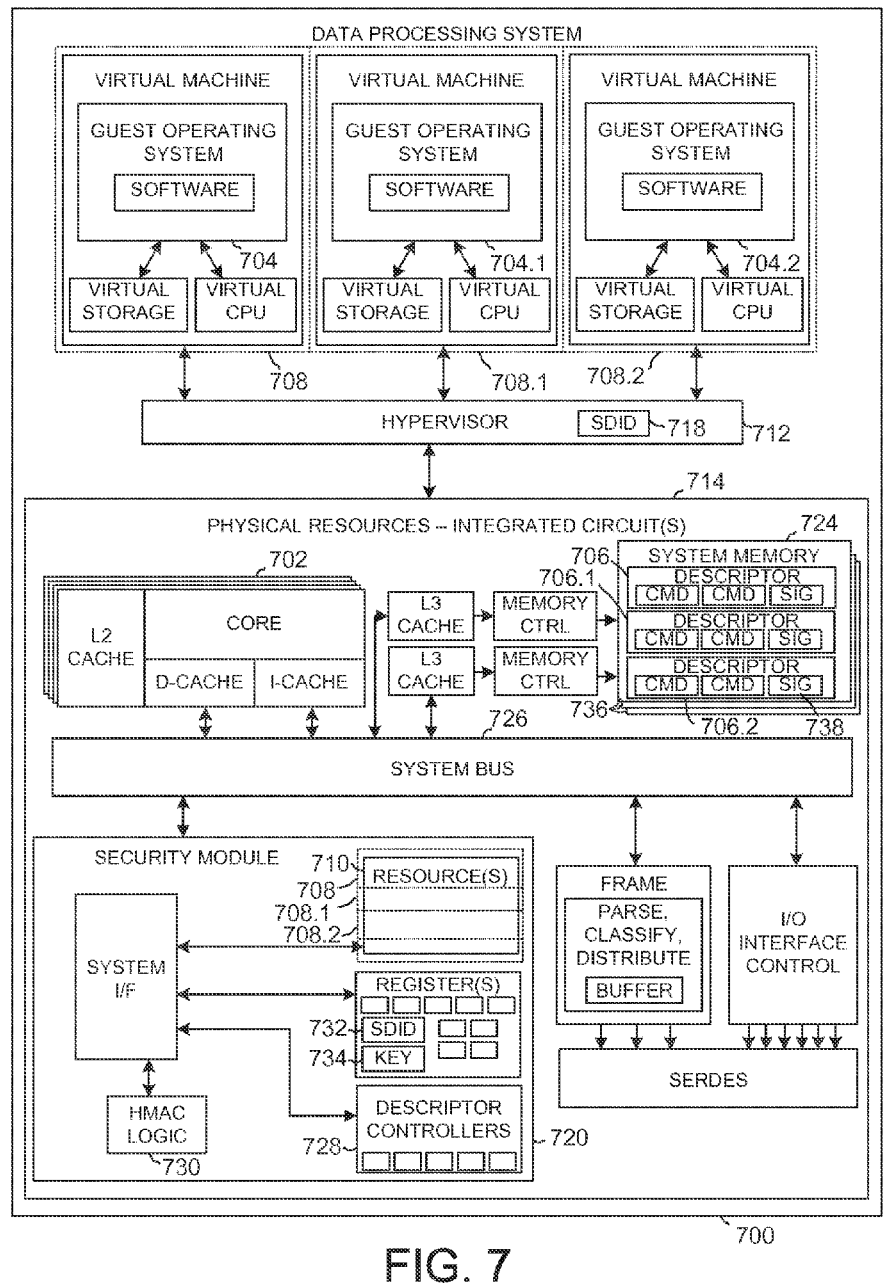
FIG. 7 is a schematic block diagram depicting an embodiment of a data processing system that is configured to attain separation between trusted descriptors.

Referring to FIG. 7, a schematic block diagram depicts an embodiment of a data processing system 700 that is configured to attain separation between trusted descriptors 706, for example enabling conversion of trusted descriptors that are all functionally equivalent to trusted descriptors 706 of multiple different classes. In some embodiments, this separation of trusted descriptors 706 can be used to protect resources 710 among a plurality of guest operating systems 704 in a virtual system. Thus, the various classes can be separated so that a first guest operating system 704.1 has one class of trusted descriptors 706.1 and a second guest operating system 704.2 has another class of descriptors 706.2, forming different groups for which separation is enabled.

An embodiment of a data processing system 700 can include a core processor 702 that can run a virtual machine monitor 712 such as a hypervisor and multiple operating systems 704, called guest operating systems. The data processing system 700 can further include an integrated circuit chip 714, for example a system on a chip (SOC) comprising the core processor 702, memory 724, a system bus 726, and one or more peripheral devices including a security module 720 which can be a cryptographic processor. The security module 720 can include one or more descriptor controllers 728 that can read and execute descriptors 706. The security module 720 can also include HMAC logic 730 which can be used in the signing process and the verification process. The security module 720 can further include one or more security domain identifier registers 732 which can be constrained to be programmed only by the hypervisor 712 but not by other software. Thus, the security domain identifier registers 732 are integrity-protected and can be read by any users but have constraints capability for modifying. The security module 720 can include hardware and engines, for example, for encryption functions, hashing functions, random number generation and the like. The data processing system 700 and, specifically, the security module 720 include multiple sets of resources 710.

Examples of resources 710 can include key registers 734 or memory partitions 736 that are specific to one or more of multiple security domains 708, 708.1, 708.2 corresponding to the security domains of the guest operating systems, typically corresponding to a guest operating system 704. One or more of a group of security domain resources 710 can be restricted to a particular trusted descriptor 706 only. A virtual system thus can have at least two security domains 708 since a system with only a single security domain falls back to a non-virtual status with simply trusted descriptors and not virtualized trusted descriptors. A system with multiple security domains 708 has at least two sets of restricted resources 710. In an example embodiment, all restricted resources 710 can be within the security module 720. Each of those sets of resources 710 for the different security domains 708 can be divided into two segments including non-restricted resources that can be accessed using normal descriptors and restricted resources that only the trusted descriptor can access.

The security module 720 can be configured for usage with multiple core processors 702 and an extensive interconnect fabric with multiple devices. The devices can include peripherals such as DMA engines, Ethernet, some type(s) of input/output (I/O) ports, and the like. The system 700 can use external memory 724 to run programs and for data that the security module 720 or engine accesses in normal operation.

In some embodiments, a descriptor controller 728 is a processor that uses the trusted descriptor 706. The descriptor controller 728 can receive a descriptor (untrusted) for processing to create a trusted descriptor 706. The trusted descriptor 706.1 is proprietary to a particular operating system, for example guest operating system 704.1, so that another operating system such as guest operating system 704.2 which attempts to use the trusted descriptor 706.1 is not granted access to proprietary information for the first guest operating system 704.1. When descriptor controller 728 verifies the descriptor 706.1 and receives a verification error, descriptor controller 728 is unable to access the proprietary information in the corresponding portions of the protected resources 710. The trusted descriptors 706 and resources 710 are arranged in different classes, so that trusted descriptors for one operating system will not be usable by any other operating systems.

The trusted descriptors 706 can grant extra permission to protected resources 710. For example, the security module 720, which is connected to the bus 726 and to memory 724, can include an internal register 732. The security module 720 executes the descriptor 706 and is informed of the signature 738 of the descriptor 706, enabling the security module 720 to create and authenticate the signature 738. The protected resources 710 can be, for example, key registers 734. When the security module 720 runs a trusted descriptor 706 and the signature 738 verifies, identifying that the descriptor is precisely one that the creator of the descriptor designates to enable access, access to the key register 734 is allowed. Access to the key register 734 would be denied if the same descriptor 706 is run without the signature 738.

Similarly, access to a resource 710, such as secured memory for storing secret information, can be controlled using the trusted descriptor 706. If a normal (untrusted) descriptor is used to attempt to access that region in the secured memory, the access is denied. If a trusted descriptor 706 is run and the signature is correct, then access is granted to the data in that region of secured memory.

Another example of a resource 710 that can be controlled using the trusted descriptor 706 is a cryptographic function internal to hardware. For example, a protected resource can be a device such as a government access controlled device that implements type I encryption algorithms in which the algorithm is secret. Software cannot implement the algorithm because the algorithm is not known. However, usage of a trusted descriptor can enable hardware to implement the algorithm if accessed and used exactly in an authorized manner, as specified by the trusted descriptor. Accordingly, the trusted descriptor enables access to a cryptographic function to which access would otherwise be denied.

A further example of a secured resource 710 is key data located in secured memory with a secured memory controller which exerts control over the type of accesses that can be made. The key data, which can be used as a key for encryption, can be positioned in a partition to prevent access using a normal (untrusted) descriptor. A trusted descriptor can be used to enable access that key as an ordinary piece of data to manipulate in some way.

The trusted descriptor 706 can thus be used to enable an extended range of accesses. For example, a normal (untrusted) descriptor can enable a key value for use as an encryption key, but a capability to access the key value and write the key value to external memory for public access is to be prohibited. What may be desired is a capability to use the key value but not to allow reading of the actual key value. A trusted descriptor 706 can be used to treat the key value in a prescribed manner and thus be able to read the key value for use and manipulation in a manner allowed by the trusted descriptor 706, while disallowing any other use or access. In contrast, a normal descriptor is not trusted, or more precisely just trusted enough to use the key to decrypt the data but not trusted sufficiently to have unlimited access to the key.

In some embodiments and/or applications, trusted descriptors 706 can be used in a dynamic manner with security protection of internal information. A trusted descriptor 706 can be used to dynamically modify data, such as a counter or other functional block, as part of the descriptor. A signature operation can be performed on the descriptor including the modified data. Thus a capability to enforce a particular version of information can be attained by placing a secured version number inside the trusted descriptor. For example, to upgrade software and track a version number of the upgraded software, the descriptor can be enabled to increment the version number then apply a signature to that descriptor to protect that version number. The version number is operated upon only in a manner authorized by the trusted descriptor, enabling placement of the version number in a secure place that is protected.

In some embodiments, the trusted descriptors 706 can be virtualized through usage of registers 732 in the security module 720 which can hold a SDID 718. The hypervisor 712 can set the SDID 718 for operating systems 704 configured for usage by the security module 720. When a first operating system 704.1 runs the security module 720, the SDID 718 can be set, for example, to the value 1. When a second operating system 704.2 runs, the SDID 718 can be set to the value 2. The descriptors 706 can be signed, converting normal (untrusted) descriptors into trusted descriptors 706 by running a signature check which uses, for example, HMAC in which the SDID 718 is attached to the descriptor 706 when the keyed hash is generated. Thus when first operating system 704.1 is running, the keyed hash is run not only over the trusted descriptor 706.1 but also over the SDID value 1. When the second operating system 704.2 executes the descriptor, the keyed hash is run over the contents of the descriptor and the value 2 indicating the SDID value 2, resulting in different HMAC values and separating among multiple operating systems and associated resources. The first operating system 704.1, when running, can access all trusted descriptors 706.1 signed with the SDID value of 1. The second operating system 704.2, when running, can access all trusted descriptors 706.2 signed with the SDID value of 2. If the first operating system 706.1 attempts to execute a trusted descriptor 706.2 for the second operating system 704.2, then the signature value would be correct if the SDID value was 2, but because the first operating system 704.1 runs, the hardware is forced to use the SDID value 1 which is the SDID of the currently executing operating system and the signatures do not match. Thus the descriptor would not attain the elevated permission (privilege) of the trusted descriptor, and also ends execution prematurely with an error such as an illegal trusted descriptor signature error notification. The valid SDID values stored in registers 732 are programmed by the hypervisor 712, generally the most trusted software on the chip, for the individual guest operating systems 704. The registers 732 are positioned in locations that cannot be accessed by the guest operating systems 704.

The SDID 718 has multiple aspects of functionality. The SDID 718 identifies the appropriate operating system and also specifies the security domain within which the operating system is executing. The SDID 718 enables support for multiple separate security domains. The SDID 718 identifies the resources which are specific to each security domain. The SDID 718 can also identify resources that can be accessed by descriptors. The SDID 718 can elevate permissions to selected resources. In some applications and/or conditions, the SDID 718 can identify a resource which is specific to a particular operating system without elevating permissions. Any descriptor running under a first operating system 704.1 can have access to a first operating system resource 710. A trusted descriptor 706.1 for the first operating system 704.1 can access a restricted first operating system resource 710. So every operating system 704 has two types of resources available including normal resources which any descriptor 706 can use and private, protected, or restricted resources that can only be accessed with a trusted descriptor 706 running with the corresponding appropriate SDID 718.

In an illustrative embodiment, the security module 720 is configured to distinguish between different software components, for example recognizing the hypervisor 712 which is allowed to specify the SDIDs 718, and distinguishing the hypervisor 712 from the guest operating system software components 704 which are allowed to create and attempt to use the descriptors 706. More particularly, when a first operating system 704.1 passes a descriptor or a trusted descriptor 706 to a security module 720, the security module 720 facilitates maintenance of separation by identifying the descriptor 706.1 as being received from the operating system 704.1 and thus applying the proper SDID 718. If a descriptor 706.2 is received from a second operating system 704.2, the security module 720 can identify the descriptor 706.2 to apply the correct SDID 718 for the second operating system 704.2. One implementation for identifying the descriptor 706 can be the use of an SDID register 732 which can be used to allow only one operating system to have access to the security module 720. In one arrangement, the security module 720 or other hardware can assume that the operating system is using whatever SDID 718 is programmed into the SDID register 732 by the hypervisor 712. Another implementation for identifying the descriptor 706 is the use of a software portal for which individual operating systems can issue a request to hardware that is identified by the software module that is used. The software portal can be a block of address space in which a first operating system 704.1 passes information through one address space and a second operating system 704.2 passes information through another address space. The hypervisor 712 can program a memory control device such as a memory management unit (MMU) to restrict access of each software portal to the proper operating system. Internal to hardware, the security module 720 can use the software portal to identify the operating system and access the proper SDID value to use with that trusted descriptor.

Figure 8:
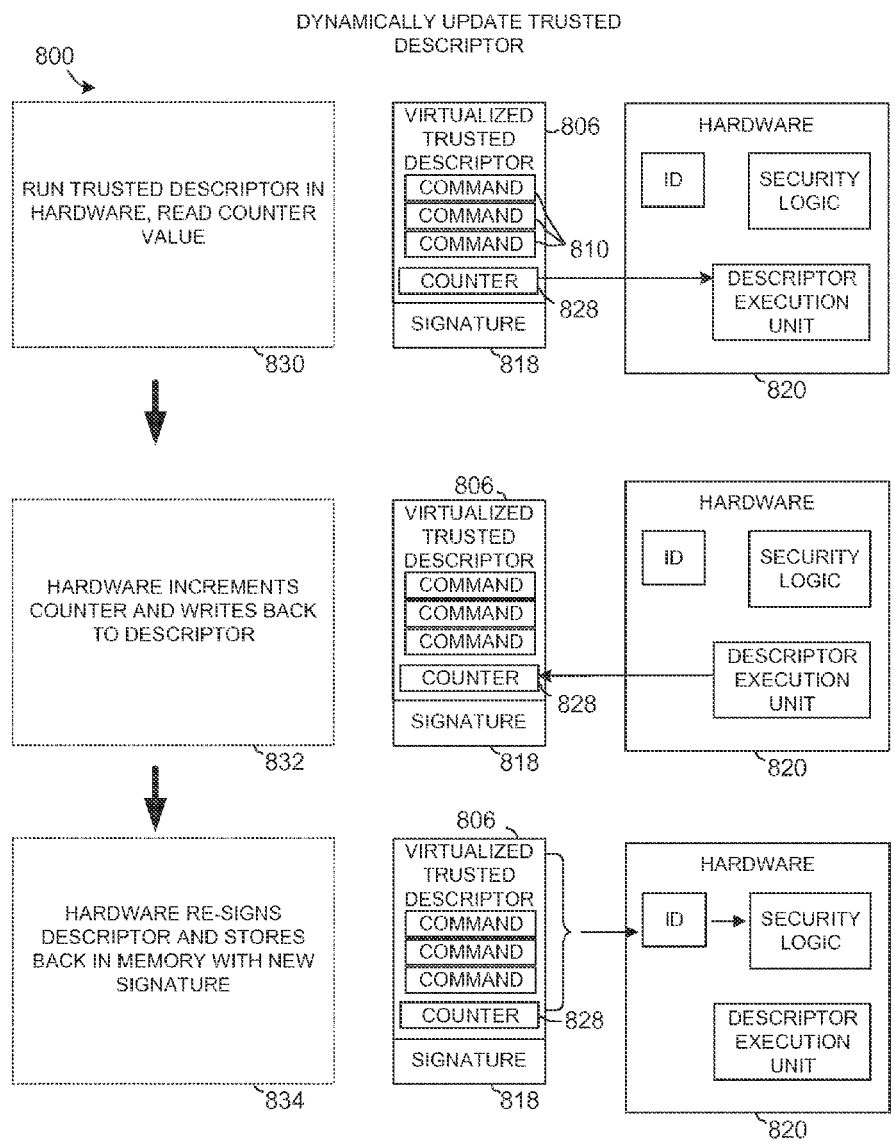
FIG. 8 is a schematic block and flow diagram showing a system and technique for dynamically modifying a trusted descriptor.

Referring to FIG. 8, a schematic block and flow diagram depicts a system and technique for dynamically updating or modifying 800 a trusted descriptor 806. For example, a trusted descriptor 806 can contain a counter 828 which increments each time the descriptor 806 is run, enabling a determination of how many times the trusted descriptor 806 has executed. Upon running 830, hardware 820 running the descriptor 806, as directed by commands 810 in the descriptor 806, reads the value in the counter 828 which is part of the descriptor 806. The counter value is incremented 832 and overwritten onto the descriptor 806 again. Then the descriptor 806 with the new value is re-signed 834 then stored back into memory with the new signature 818. The updated counter value enables tracking of how often the descriptor 806 has actually been executed. And the descriptor 806 with that counter value is re-signed every time the descriptor 806 is run. Accordingly, the trusted descriptor can be either a static trusted descriptor or a dynamic trusted descriptor.

An embodiment of an electronic circuit includes a module configured to perform operations specified by a descriptor including a set of commands that define the operations, a digital signature that verifies validity of the descriptor, and a security domain identifier that specifies access to resources in a plurality of security domains. According to a further embodiment, the module is configured to receive the security domain identifier and to digitally sign the descriptor incorporating the security domain identifier within the signed descriptor. According to a further embodiment, the module is configured to include logic that enables controlled signing of descriptors using the security domain identifier, such that the security domain identifier is specified by a virtual machine monitor configured to specify the security domain identifier distinctively for a plurality of guest operating systems in a virtualized system and protect integrity of the security domain identifier. According to a further embodiment, the module is configured to include logic that virtualizes the descriptor by combining the security domain identifier with the descriptor and then signing the combined security domain identifier and descriptor, the security domain identifier set by a supervisory virtual machine monitor for usage by a guest operating system that is operable when signing the descriptor, wherein the descriptor is tagged with the security domain identifier but unable to modify the security domain identifier. According to a further embodiment, the module is configured to include logic that tags signed descriptors with the security domain identifier by combining the descriptor with the security domain identifier before signing the descriptor. According to a further embodiment, the module is configured to include logic that authenticates descriptors and grants the authenticated descriptors elevated permissions only when the security domain identifier used for authentication is the same as the security domain identifier used when signing the descriptor. According to a further embodiment, the module is configured to include logic that elevates permissions only to resources specified by the security domain identifier to be owned by a guest operating system associated specifically with the descriptor but not to other resources.

An embodiment of an information processing system includes logic operable to perform operations in a virtualized system including a plurality of guest operating systems using descriptors that specify a set of commands defining the operations in a plurality of security domains and that specify permission to a plurality of resources selectively for the plurality of guest operating systems. According to a further embodiment, the information processing system also includes a virtual machine monitor that allocates a plurality of resources among a plurality of users, the virtual machine monitor configured to run the plurality of guest operating systems, and set a security domain identifier distinctively for selected ones of the plurality of guest operating systems, such that the selected guest operating system is operable when signing a descriptor associated with the guest operating system by tagging the descriptor with the security domain identifier but is unable to modify the security domain identifier. According to a further embodiment, the information processing system also includes at least one descriptor including a set of commands that define the operations, a digital signature that verifies validity of the descriptor, and a security domain identifier that specifies access to resources in a plurality of security domains in a virtualized system. According to a further embodiment, the information processing system also includes a module that receives the security domain identifier and digitally signs the descriptor such that the security domain identifier is incorporated within the signed descriptor. According to a further embodiment, the information processing system also includes a module that enables controlled signing of descriptors using a security domain identifier specified by a virtual machine monitor configured to specify the security domain identifier distinctively for a selected one of the plurality of guest operating systems and protect integrity of the security domain identifier. According to a further embodiment, the information processing system also includes a module that virtualizes the descriptor by combining the security domain identifier with the descriptor and then signing the combined security domain identifier and descriptor, the security domain identifier set by a supervisory virtual machine monitor for usage by a guest operating system that is unable to modify the security domain identifier, the module operable when signing the descriptor, such that the descriptor is tagged with the security domain identifier. According to a further embodiment, the information processing system also includes a module that tags signed descriptors with the security domain identifier by combining the descriptor with the security domain identifier before signing the descriptor. According to a further embodiment, the information processing system also includes a module that authenticates descriptors and grants the authenticated descriptors elevated permissions only when the security domain identifier used for authentication is the same as the security domain identifier used when signing the descriptor. According to a further embodiment, the information processing system also includes a module that elevates permissions only to resources specified by the security domain identifier to be owned by a guest operating system associated specifically with the descriptor but not to other resources.

An embodiment of a method for securing an information system includes performing operations in a system including a plurality of entities, controlling the performance of operations using a plurality of descriptors, specifying in ones of the plurality of descriptors a set of commands defining the operations in a plurality of security domains, and specifying in ones of the plurality of descriptors permission to a plurality of resources selectively for the plurality of entities. According to a further embodiment, the method for securing an information system further includes allocating a plurality of resources among a plurality of users in a virtualized system including a plurality of guest operating systems, specifying in ones of the plurality of descriptors permission to a plurality of resources selectively for the plurality of guest operating systems, running the plurality of guest operating systems, and setting a security domain identifier distinctively for selected ones of the plurality of guest operating systems such that the plurality of guest operating systems are operable when signing the descriptor by tagging the descriptor with the security domain identifier while unable to modify the security domain identifier. According to a further embodiment, the method for securing an information system further includes receiving a security domain identifier specified to identify distinctively ones of a plurality of guest operating systems and protect integrity of the security domain identifier, enabling controlled signing of descriptors using the security domain identifier, digitally signing the descriptor incorporating the security domain identifier within the signed descriptor, tagging digitally signed descriptors with the security domain identifier by combining the descriptor with the security domain identifier before signing the descriptor, and virtualizing the descriptor by hashing the security domain identifier in combination with the descriptor and then signing the descriptor. According to a further embodiment, the method for securing an information system further includes authenticating descriptors, granting the authenticated descriptors elevated permissions only when the security domain identifier used for authentication is the same as the security domain identifier used when signing the descriptor, and elevating permissions only to resources specified by the security domain identifier to be owned by a guest operating system associated specifically with the descriptor but not to other resources.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the method actions, steps, provisioning, and components are given by way of example only. The method actions, steps, provisioning, and components can be varied to achieve the desired functionality and structure as well as modifications, which are within the scope of the claims. Variations and modifications of the embodiments disclosed herein may also be made while remaining within the scope of the following claims.

What is claimed is:

1. An electronic circuit comprising:
a module configured to perform operations specified by a descriptor comprising a set of commands that define the operations, a digital signature that verifies validity of the descriptor, and a security domain identifier that specifies access to resources in a plurality of security domains, wherein:
the module comprises logic that tags signed descriptors with the security domain identifier by combining the descriptor with the security domain identifier before signing the descriptor.

2. The electronic circuit according to claim 1 wherein:
the module is configured to receive the security domain identifier and to digitally sign the descriptor incorporating the security domain identifier within the signed descriptor.

3. The electronic circuit according to claim 1 wherein:
the module comprises logic that enables controlled signing of descriptors using the security domain identifier, wherein the security domain identifier is specified by a virtual machine monitor configured to specify the security domain identifier distinctively for a plurality of guest operating systems in a virtualized system and protect integrity of the security domain identifier.

4. The electronic circuit according to claim 1 wherein:
the module comprises logic that virtualizes the descriptor by combining the security domain identifier with the descriptor and then signing the combined security domain identifier and descriptor, the security domain identifier set by a supervisory virtual machine monitor for usage by a guest operating system that is operable when signing the descriptor, wherein the descriptor is tagged with the security domain identifier but unable to modify the security domain identifier.

5. The electronic circuit according to claim 1 wherein:
the module comprises logic that authenticates descriptors and grants the authenticated descriptors elevated permissions only when the security domain identifier used for authentication is the same as the security domain identifier used when signing the descriptor.

6. The electronic circuit according to claim 1 wherein:
the module comprises logic that elevates permissions only to resources specified by the security domain identifier to be owned by a guest operating system associated specifically with the descriptor but not to other resources.

7. An information processing system comprising:
logic operable to perform operations in a virtualized system including a plurality of guest operating systems using descriptors that specify a set of commands defining the operations in a plurality of security domains and that specify permission to a plurality of resources selectively for the plurality of guest operating systems; and
a module including logic stored in a memory, the logic stored in the memory configured to tag signed descriptors with a security domain identifier by combining the descriptor with the security domain identifier before signing the descriptor.

8. The information processing system according to claim 7 further comprising:
a virtual machine monitor operable to allocate a plurality of resources among a plurality of users, the virtual machine monitor configured to run the plurality of guest operating systems, and set the security domain identifier distinctively for selected ones of the plurality of guest operating systems, wherein the selected guest operating system is operable when signing a descriptor associated with the guest operating system by tagging the descriptor with the security domain identifier but is unable to modify the security domain identifier.

9. The information processing system according to claim 7 further comprising:
at least one descriptor comprising a set of commands that define the operations, a digital signature that verifies validity of the descriptor, and the security domain identifier that specifies access to resources in a plurality of security domains in a virtualized system.

10. The information processing system according to claim 7 further comprising:
the module including executable logic stored in the memory that receives the security domain identifier and digitally signs the descriptor wherein the security domain identifier is incorporated within the signed descriptor.

11. The information processing system according to claim 7 further comprising:
the module including executable logic stored in the memory that enables controlled signing of descriptors using the security domain identifier specified by a virtual machine monitor configured to specify the security domain identifier distinctively for a selected one of the plurality of guest operating systems and protect integrity of the security domain identifier.

12. The information processing system according to claim 7 further comprising:
the module including executable logic stored in the memory that virtualizes the descriptor by combining the security domain identifier with the descriptor and then signing the combined security domain identifier and descriptor, the security domain identifier set by a supervisory virtual machine monitor for usage by a guest operating system that is unable to modify the security domain identifier, the module operable when signing the descriptor, wherein the descriptor is tagged with the security domain identifier.

13. The information processing system according to claim 7 further comprising:
the module including executable logic stored in the memory that authenticates descriptors and grants the authenticated descriptors elevated permissions only when the security domain identifier used for authentication is the same as the security domain identifier used when signing the descriptor.

14. The information processing system according to claim 7 further comprising:
the module including executable logic stored in the memory that elevates permissions only to resources specified by the security domain identifier to be owned by a guest operating system associated specifically with the descriptor but not to other resources.

15. A method for securing an information system comprising:
performing operations in a system including a plurality of entities;
controlling the performance of operations using a plurality of descriptors;
specifying in one or more of the plurality of descriptors a set of commands defining the operations in a plurality of security domains;
specifying in one or more of the plurality of descriptors permission to a plurality of resources selectively for the plurality of entities;
digitally signing one or more of the plurality of descriptors incorporating a security domain identifier within the signed descriptor; and
tagging digitally signed descriptors with the security domain identifier by combining one or more of the plurality of descriptors with the security domain identifier before signing the descriptor.

16. The method for securing an information system according to claim 15 further comprising:
allocating a plurality of resources among a plurality of users in a virtualized system including a plurality of guest operating systems;
specifying in one or more of the plurality of descriptors permission to a plurality of resources selectively for the plurality of guest operating systems;
running the plurality of guest operating systems; and
setting a security domain identifier distinctively for selected one or more of the plurality of guest operating systems wherein the plurality of guest operating systems are operable when signing the one or more of the plurality of descriptors by tagging the descriptor with the security domain identifier while unable to modify the security domain identifier.

17. The method for securing an information system according to claim 15 further comprising:
receiving a security domain identifier specified to identify distinctively one or more of a plurality of guest operating systems and protect integrity of the security domain identifier;
enabling controlled signing of descriptors using the security domain identifier; and
virtualizing a descriptor by hashing the security domain identifier in combination with the descriptor and then signing the descriptor.

18. The method for securing an information system according to claim 15 further comprising:
authenticating descriptors;
granting the authenticated descriptors elevated permissions only when the security domain identifier used for authentication is the same as the security domain identifier used when signing the descriptor; and
elevating permissions only to resources specified by the security domain identifier to be owned by a guest operating system associated specifically with a descriptor but not to other resources.

* * * * *